(12) United States Patent
Nakatsugawa et al.

(10) Patent No.: US 6,828,752 B2
(45) Date of Patent: Dec. 7, 2004

(54) DRIVING EQUIPMENT AND SEMICONDUCTOR EQUIPMENT FOR ALTERNATING-CURRENT MOTOR

(75) Inventors: Junnosuke Nakatsugawa, Hitachi (JP); Hitoshi Ohura, Mito (JP); Tsuyoshi Tanaka, Hitachi (JP); Tunehiro Endo, Hitachiota (JP); Yukio Kawabata, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/606,960

(22) Filed: Jun. 27, 2003

(65) Prior Publication Data

US 2004/0056632 A1 Mar. 25, 2004

(30) Foreign Application Priority Data

Sep. 25, 2002 (JP) ...................................... 2002-278319

(51) Int. Cl.$^7$ ................................................ H02P 5/34
(52) U.S. Cl. ........................ 318/801; 318/727; 318/807; 318/811
(58) Field of Search ................................ 318/811, 807, 318/801, 727; 363/41

(56) References Cited

U.S. PATENT DOCUMENTS 6,169,670 B1 * 1/2001 Okubo et al. .................. 363/41
2002/0060548 A1 * 5/2002 Iwaji et al. .................. 318/727

FOREIGN PATENT DOCUMENTS

JP 11-341863 12/1999 ............. H02P/6/10

* cited by examiner

*Primary Examiner*—Karen Masih
(74) *Attorney, Agent, or Firm*—Antonelli, Terry, Stout & Kraus, LLP

(57) ABSTRACT

The present invention enables modulated wave signals having extremely small waveform distortion to be generated using a relatively simple circuit, and thereby it is possible to hold down vibrations and noise of a motor, which are attributable to torque ripples. In order to remove defects of the conventional techniques, the circuit generates a plurality of trapezoidal wave signals having at least two constant levels based on position sensing signals of magnetic pole of a motor, generates quasi-sinusoidal wave signals at a quasi-sinusoidal wave modulator based on the plurality of trapezoidal wave signals, and compares the quasi-sinusoidal wave signals with a carrier wave so as to perform PWM control of an inverter.

13 Claims, 18 Drawing Sheets

Fig. 18
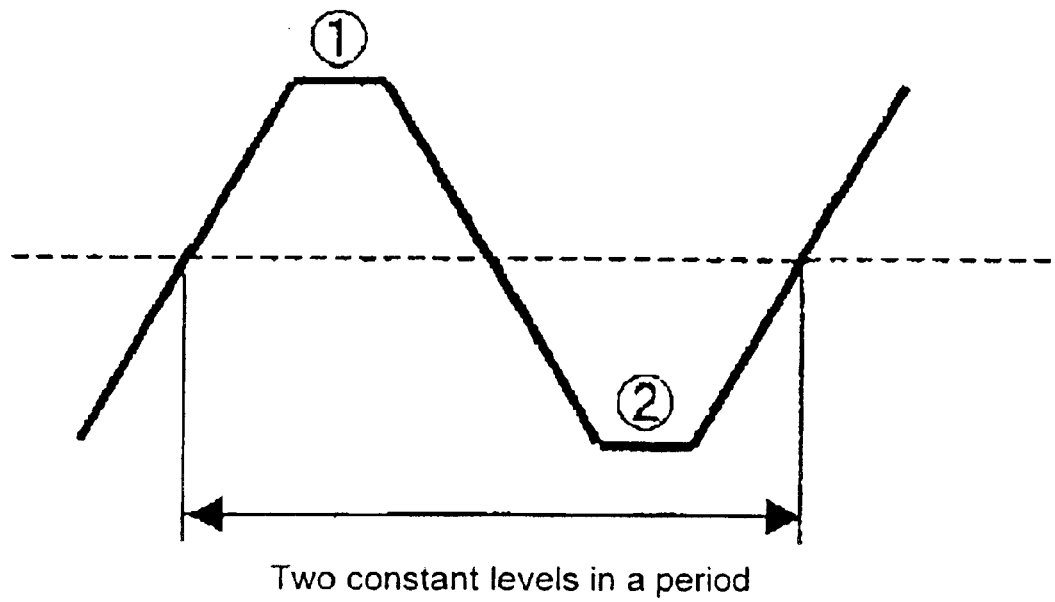
Two constant levels in a period
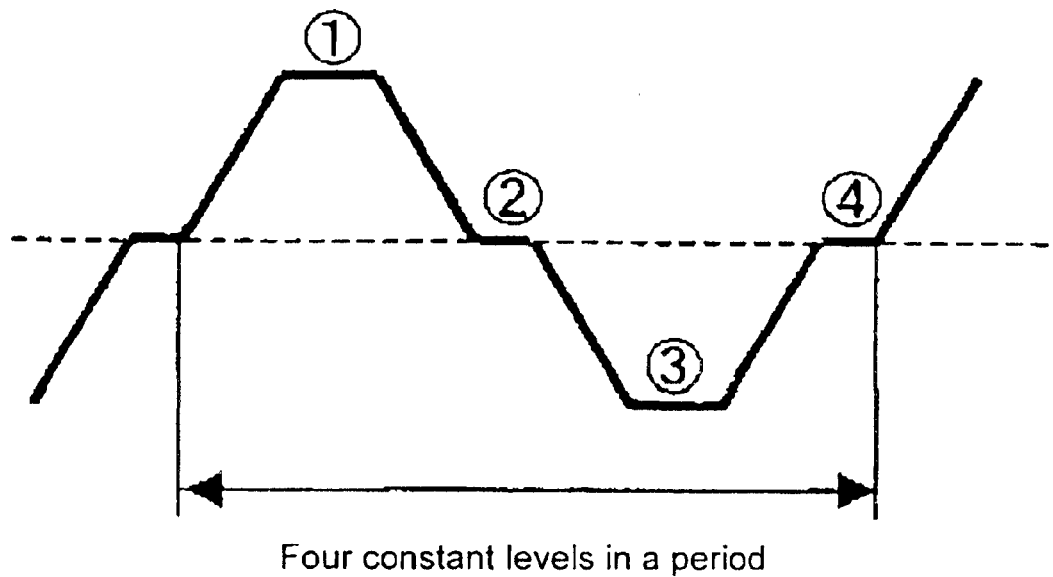
Four constant levels in a period

DRIVING EQUIPMENT AND SEMICONDUCTOR EQUIPMENT FOR ALTERNATING-CURRENT MOTOR

BACKGROUND OF THE INVENTION

1. Technical Field

The present invention relates to a driving apparatus and a semiconductor apparatus for driving an alternating-current motor of a home electric appliance or an industrial facility.

2. Background Art

In recent years, in the above-mentioned product field, methods for driving brushless motors by inverters have been expanding. In the field of home electric appliances, the price competition has intensified, and thus there is a demand for inexpensive inverter units. Therefore, for an inverter-driving apparatus with a brushless motor, a 120-degree energizing method which permits a simple circuit configuration and relatively high motor-efficiency is used.

In a motor driving circuit using the 120-degree energizing method, a current is applied to two of three-phase windings for driving the motor by detecting a magnetic-pole position of a motor rotor by a magnetic-pole position detector and controlling the on/off state of each switching element of an inverter unit in response to the time at which the magnetic flux of the rotor is orthogonal to the magnetic pole of a stator.

In this 120-degree energizing method, it is known that torque ripples take place at times of switching the windings to be energized (commutation), and thereby noise is generated.

Further, if a motor current waveform includes a large amount of higher harmonic component, motor torque generally tends to have ripples. The motor torque is a product of motor-specific inductive voltage and motor current, and thus largely depends on the motor current waveform. The torque ripples vibrate the motor itself, which causes a base where the motor is mounted to vibrate. This vibration results in noise.

As a method for reducing the noise, there is a method in which a motor driving current is made sinusoidal by means of so-called PWM (Pulse Width Modulation) control. Specifically, a sinusoidal modulated wave signal, which is synchronized with the position of the rotor, is generated, a PWM signal is generated by comparing the modulated wave signal with a carrier wave signal, and a sinusoidal wave PWM voltage is outputted from the inverter. Then, in order to generate the sinusoidal modulated wave signal synchronized with the position of this rotor, a micro computer is used as well as a PWM timer embedded therein. However, this method requires a complicated and expensive apparatus in comparison with the 120-degree energizing method.

In contrast, as a method for achieving a motor driving circuit with low noise using a relatively simple circuit, there is a method for reducing motor noise by smoothening current waveforms, wherein an analog circuit is used for generating a sinusoidal wave voltage instruction and three levels of voltage signal waveforms are smoothed using a filter circuit (refer to a patent document 1, for example).

Additionally, there is a method of generating a quasi sinusoidal wave with less distortion (refer to a patent document 2, for example).

Reference Document 1: JP Patent Publication (Unexamined Application) No. 2001-251886

Reference Document 2: JP Patent Publication (Unexamined Application) No. 11-341863

According to the method disclosed in JP Patent Publication (Unexamined Application) No. 2001-251886, there remains large distortion in modulated waves, and therefore torque ripples virtually remain. In comparison with the 120-degree energizing method, it does not produce an effect large enough to substantially reduce noise when driving a motor.

On the other hand, according to the method disclosed in JP Patent Publication (Unexamined Application) No. 11-341863, the size of the circuit is considered large, and this is not convenient for integrating the circuit into a monolithic IC.

SUMMARY OF THE INVENTION

The present invention has been devised by taking the above-mentioned points into account, and an object of the present invention is to provide a driving apparatus for an alternating-current motor capable of reducing torque ripples with a relatively simple circuit.

In order to overcome these defects of the conventional technologies, according to the present invention, an inverter is PWM-controlled by generating a plurality of trapezoidal wave signals having at least two constant levels based on a position sensing signal of magnetic pole of a motor, generating a quasi-sinusoidal wave signal at a quasi-sinusoidal wave modulator from the plurality of trapezoidal wave signals, and comparing a carrier wave with the quasi-sinusoidal wave signal.

BRIEF DESCRIPTION OF THE DRAWINGS

FIG. 18 illustrates trapezoidal waves.

DESCRIPTION OF THE PREFERRED EMBODIMENTS

First Embodiment

A first Embodiment of the present invention will be described using FIGS. 1 to 7.

<Description of the Entire Configuration (FIG. 1)>

Figure 1:
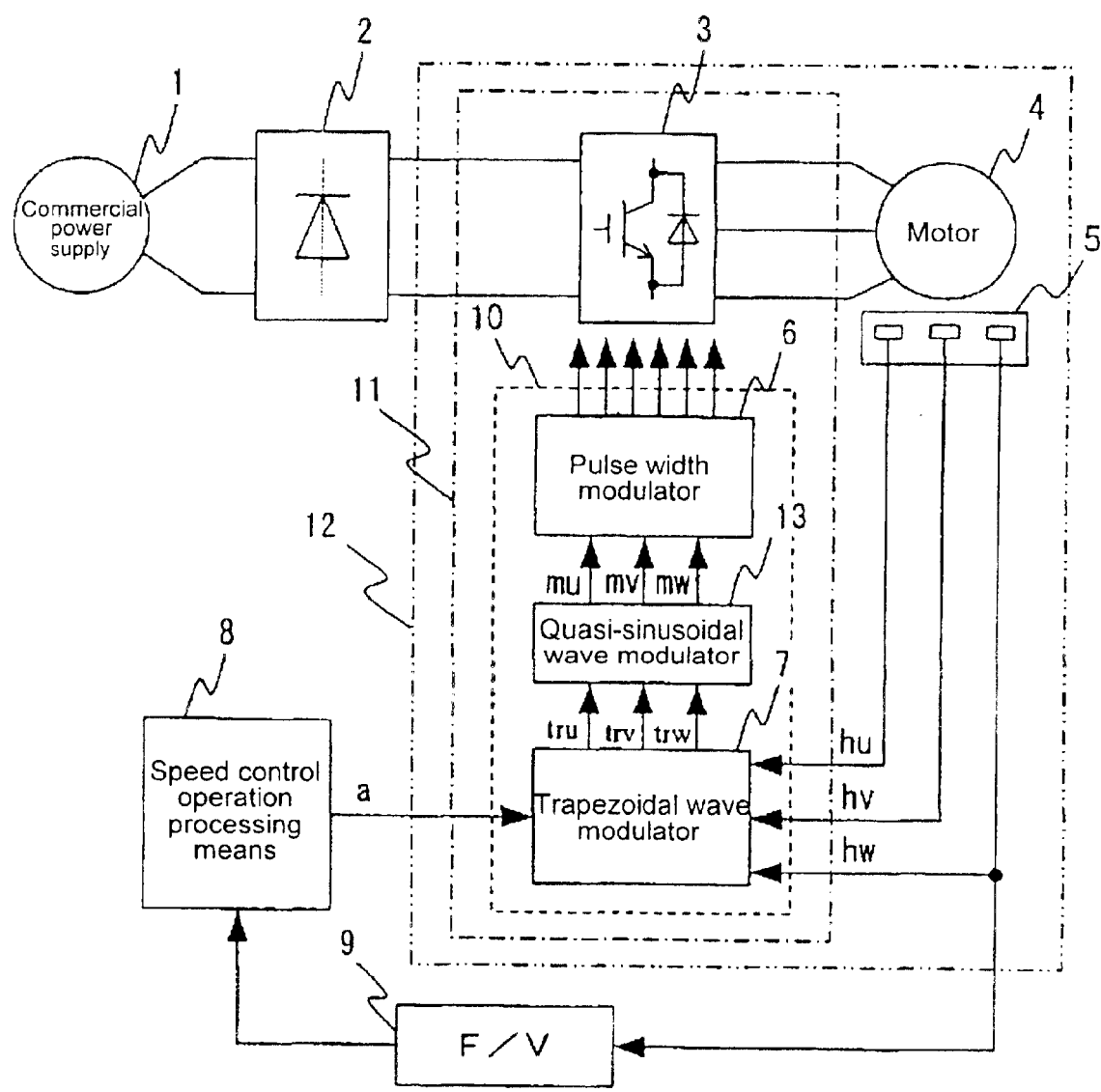
FIG. 1 is a block diagram of a first Embodiment according to the present invention.

In FIG. 1, there are provided a commercial power source 1, a rectifying circuit 2, a single chip inverter 11 comprising a monolithic IC, a three-phase brushless motor 4, speed control operation processing means 8, and an F/V converter 9. The single chip inverter 11 comprises an inverter 3, a trapezoidal wave modulator 7 as a first circuit for generating a modulated wave signal, a quasi-sinusoidal wave modulator 13 as a second circuit for generating a modulated wave signal, and a control circuit 10 having a pulse width modulator 6.

The rectifying circuit 2 is connected to the commercial power source 1, and a direct voltage is supplied to the inverter 3 via the rectifying circuit 2. An alternating current with variable voltage and variable frequency is supplied to the motor 4 by the inverter 3.

The motor 4 is a motor comprising a permanent magnet embedded in a rotor, and it is provided with a magnetic-pole position detecting circuit 5 that detects a magnetic-pole position of the rotor by detecting magnetic flux generated from the permanent magnet. The magnetic-pole position detecting circuit 5 comprises three Hall ICs corresponding to respective phases and is provided so that a phase difference between electrical angles for the three phases becomes 120°, thereby outputting position detecting signals hu, hv, and hw as logical signals.

Herein, the single chip inverter 11 is mounted inside a housing of the motor 4, and it constitutes the brushless motor 12 having a built-in driving circuit together with the motor 4 and the magnetic-pole position detecting circuit 5.

The inverter 3 constituting the single chip inverter 11 is a circuit in which six switching elements such as power MOSFET and an insulated gate bipolar transistor (IGBT) are combined. The on/off state of each switching element is controlled in accordance with a PWM signal from the pulse width modulator 6.

To the trapezoidal wave modulator 7 constituting the control circuit 10 of the single chip inverter 11, the above magnetic-pole position detecting signals hu, hv, and hw, and a voltage control signal a outputted from the speed control operation processing means 8 are inputted. Based on these signals, three-phase trapezoidal wave signals tru, trv, and trw having two constant levels are generated. In this embodiment, the period during which the signals keep the constant level is represented by an electrical angle of 30°.

Further, the quasi-sinusoidal wave modulator 13 constituting the control circuit uses these trapezoidal wave signals tru, trv, and trw as inputs and generates three-phase quasi-sinusoidal wave signals mu, mv, and mw.

Furthermore, the pulse width modulator 6 generates PWM signals for the six switching elements constituting the inverter 3 by comparing the quasi-sinusoidal wave signals mu, mv, and mw as inputs with an internally-generated carrier signal.

On the other hand, the position detecting signals hu, hv, and hw are inputted into the F/V converter 9 (frequency-to-voltage converter) and the F/V converter outputs a speed voltage signal corresponding to the actual speed.

The speed voltage signal outputted from the F/V converter 9 is inputted into the speed control operation processing means 8, and is compare with a speed instruction set inside the speed control operation processing means 8. The speed control operation processing means outputts the voltage control signal a so that the deviation among them becomes zero, and then the voltage control signal is inputted into the trapezoidal wave modulator 7.

Herein, the quasi-sinusoidal wave means a wave having a sinusoidal waveform with a lower distortion factor than a trapezoidal wave.

Figure 2:
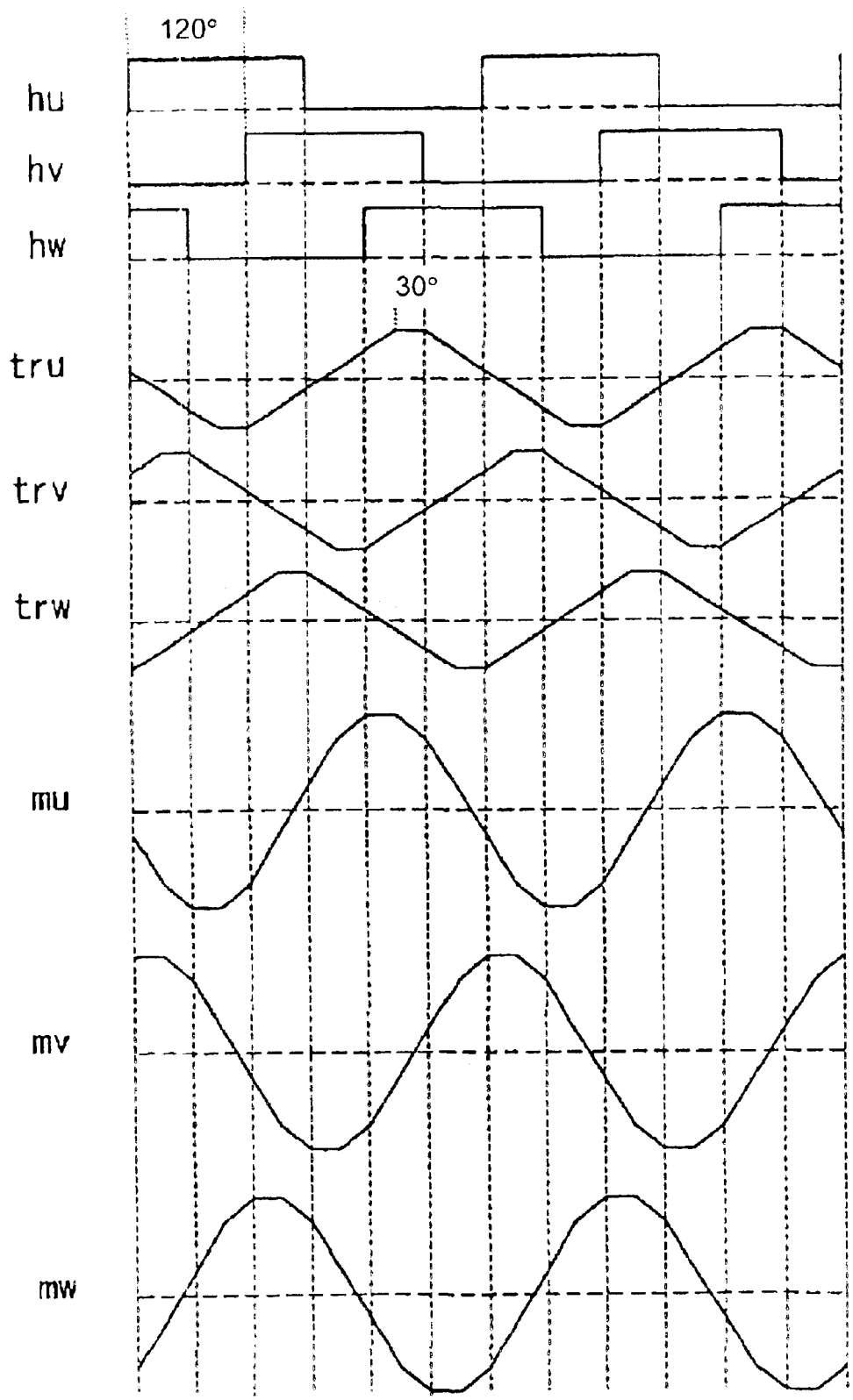
FIG. 2 illustrates operation waveforms of each part in FIG. 1.

<Description of FIG. 2>

Next, waveforms of each part regarding the control circuit 10 will be described using FIG. 2.

The position detecting signals hu, hv, and hw are rectangular wave signals that keep a phase difference with an electrical angel of 120°, and the trapezoidal wave signals tru, trv, and trw have a flat part of an electrical angle of 30°. Further, the quasi-sinusoidal wave signals mu, mv, and mw are approximated by the broken line.

The phase of the trapezoidal wave signals tru, trv, and trw are synchronized with the position detecting signals hu, hv, and hw, respectively. For example, the timing to start its inclination from the flat part of the trapezoidal wave signal tru agrees with a rising or falling of the position detecting signal hv. However, the amplitude of the trapezoidal wave signal is determined by the voltage control signal a.

Hereinafter, the major parts of the present invention will be described in detail.

<Trapezoidal Wave Modulator 7 (FIGS. 3 and 4)>

The inside of the trapezoidal wave modulator 7 will be described using FIGS. 3 and 4.

Figure 3:
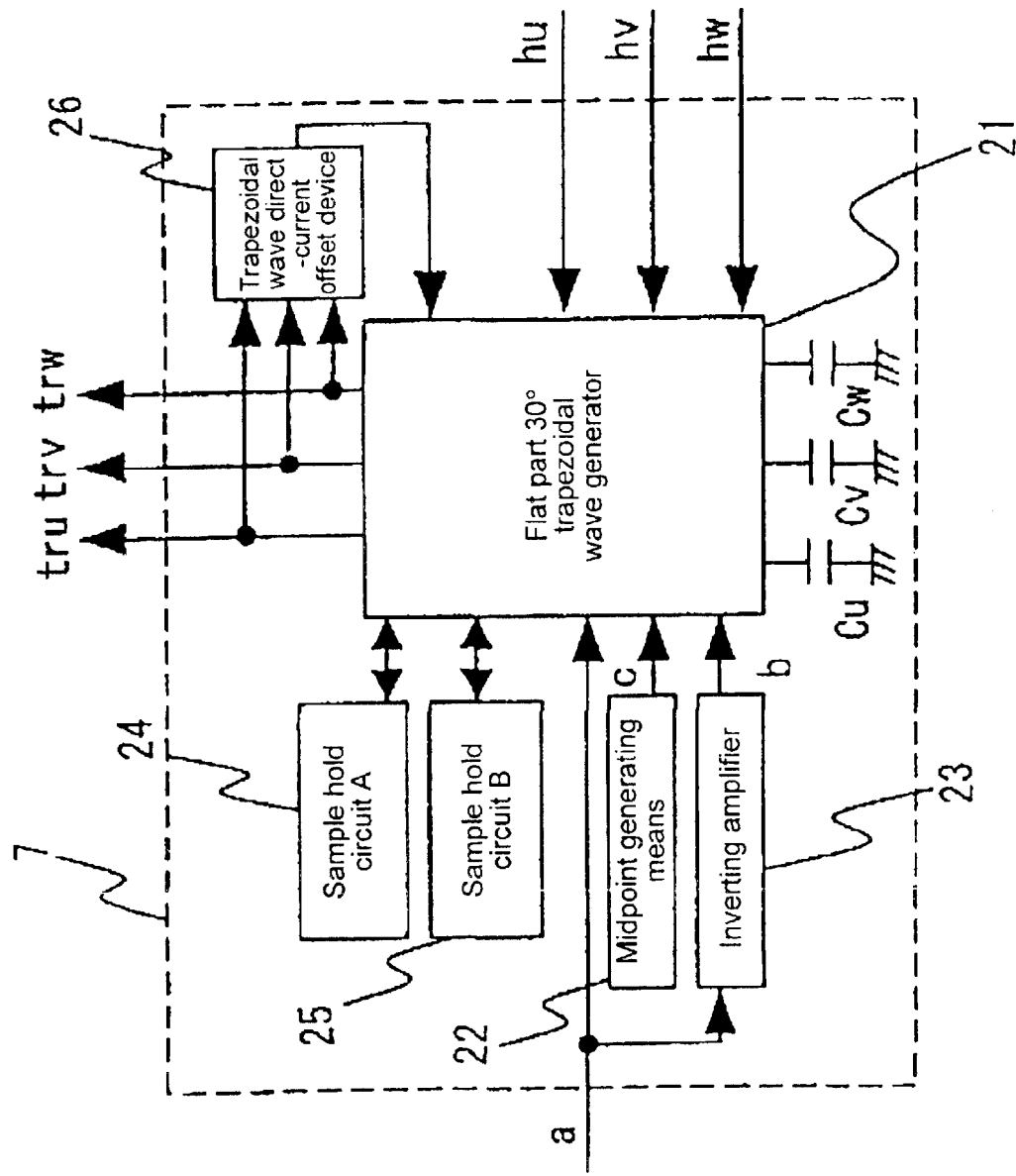
FIG. 3 is a block diagram of a trapezoidal wave modulator according to the first Embodiment.

FIG. 3 illustrates a configuration of the trapezoidal wave modulator 7. The trapezoidal wave modulator 7 comprises a trapezoidal wave generator 21 for generating a trapezoidal wave having a flat part of 30° as the center thereof, and further comprises a midpoint generating means 22, an inverting amplifier 23, two sample hold circuits A and B (24 and 25), a trapezoidal wave direct-current component offset device 26, and three capacitors Cu, Cv, and Cw.

One of the voltage control signals a from the speed control operation processing means 8 is directly inputted into the trapezoidal wave generator 21 and the other is inverted via the inverting amplifier 23 to the other voltage control signal b and inputted into the trapezoidal wave generator 21.

The midpoint generating means 22 outputs a midpoint signal c having an electric potential which is a median between electric potentials of the two voltage control signals a and b. The midpoint signal c is inputted into the trapezoidal wave generator 21.

Further, the position detecting signals hu, hv, and hw are inputted into the trapezoidal wave generator 21.

The two sample hold circuits A and B (24 and 25) are used to keep a certain voltage level of a trapezoidal wave signal. The three capacitors generate voltage waveforms by charging and discharging from a constant-current source (not shown) inside the trapezoidal wave generator 21. Further, the trapezoidal wave direct-current component offset device 26 is used to compensate for a median between the maximum and the minimum of the trapezoidal wave signal.

Figure 4:
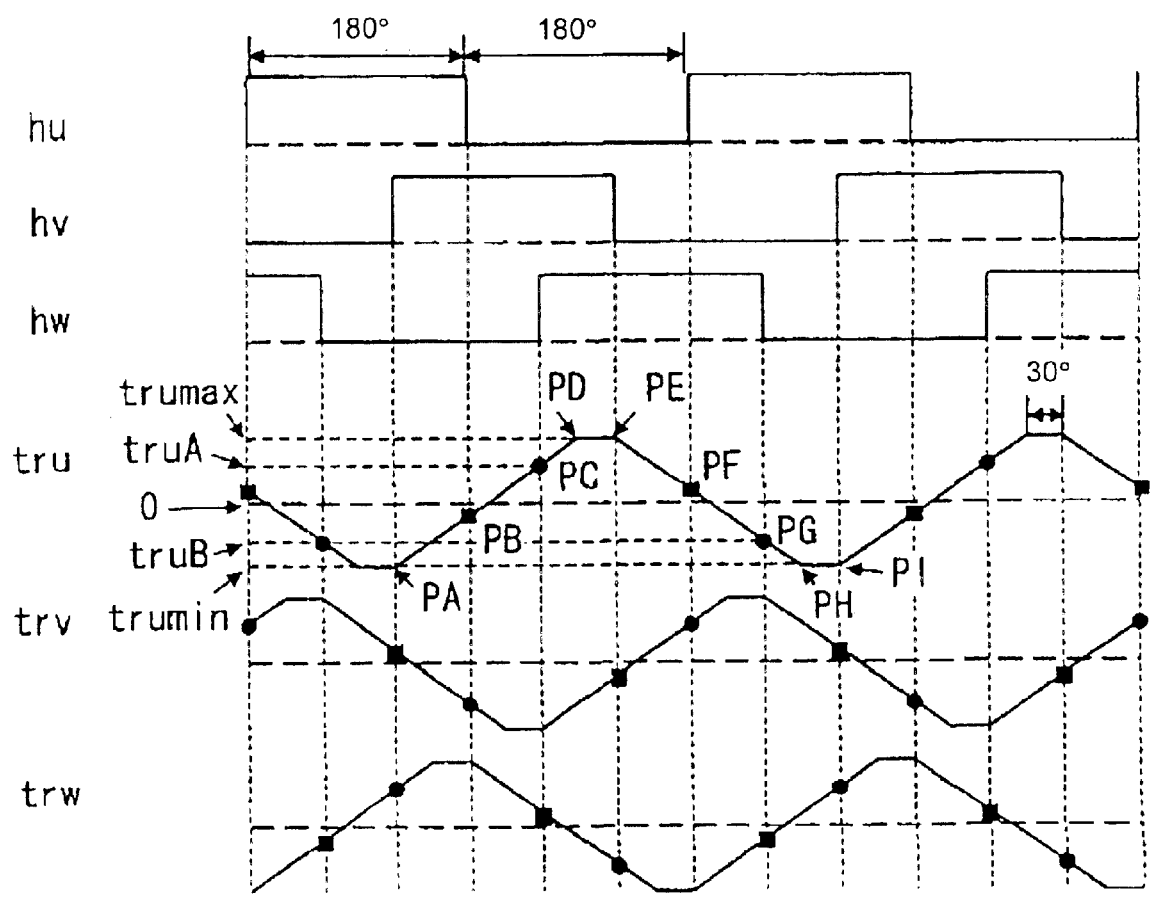
FIG. 4 illustrates waveforms of major parts of the trapezoidal wave modulator according to the first Embodiment.

FIG. 4 illustrates waveforms of each part of the trapezoidal wave modulator 7 having the above configuration, and its operation will be described using this figure.

In the trapezoidal wave generator, as shown in FIG. 4, a slope part of rising edge of a U-phase trapezoidal wave tru is formed by, for example, starting to charge a U-phase capacitor Cu with a constant-current source at a timing PA of rising edge of a Hall IC signal hv. Then, at a time PC when there is a rising edge of the Hall IC signal hw, a voltage value of the U-phase capacitor is incorporated into the sample hold circuit A (24), taking that value as tru A.

Here, in an ideal trapezoidal wave with a flat part of 30°, the intermediate size between trumax and trumin as the sizes of upper and lower flat parts, respectively, of the trapezoidal wave is regarded as zero-level. At that time, the upper limit value trumax as the maximum of the trapezoidal wave is obtained by the equation, trumax=truA×5/3. Thus, the trumax is computed based on truA in advance, and charging is stopped at a timing PD when the voltage of the U-phase capacitor becomes the trumax so that the upper limit value trumax is kept and the upper flat part of the trapezoidal wave is formed.

Then, at a time PE when there is a falling edge of the Hall IC signal hv, a slope part of falling edge of the U-phase trapezoidal wave tru is formed by starting to discharge the U-phase capacitor Cu with the constant-current source.

Next, a voltage value of the U-phase capacitor is picked up into the sample hold circuit B (25) at a time PG when there is a falling edge of the Hall IC signal hw, taking this value as truB. In the case of an ideal trapezoidal wave having a flat part of 30°, the lower limit value $tru_{min}$ as the minimum of the trapezoidal wave is obtained by the equation $tru_{min}$=truB×5/3. Thus, the trumin is computed based on truB in advance, and discharging is stopped at a time PH when the voltage of the U-phase capacitor Cu becomes the $tru_{min}$. Then, the lower limit value $tru_{min}$ is kept until a time PI when there is a rising edge of the Hall IC signal hv, thereby forming the lower flat part of the trapezoidal wave.

Trapezoidal waves each having a flat part of 30° for V-phase and W-phase are formed in the same manner as that for the U-phase to form trapezoidal waves at three phases having a 120-degree lag with each other.

<Trapezoidal Wave Direct-current Component Offset Device (FIG. 5)>

Above, the case of an ideal trapezoidal wave with a flat part of 30° is described. However, practically, depending on transitional states at times of starting a motor or changing rotation speeds, the time of charging and discharging the capacitor is varied, and thereby a stationary direct-current offset component may be generated on a trapezoidal wave having a flat part of 30°. In addition, variations of circuit elements, errors in installation positions of the position detectors, or the like may cause variations in charging and discharging voltage for the capacitor.

As a measure against the above problems, the trapezoidal wave modulator 7 is provided with a trapezoidal wave direct-current component offset device 26. The operations of the trapezoidal wave direct-current component offset device will be described using FIGS. 3 and 5. As shown in FIG. 3, trapezoidal waves tru, trv, and trw each having a flat part of 30° for each phase are inputted into the trapezoidal wave direct-current component offset device 26. Their total sum is calculated at the trapezoidal wave direct-current component offset device 26, and this total sum is subtracted from the above zero-level for obtaining −(tru+trv+trw). This value is shown as bold lines in FIG. 5.

Figure 5:
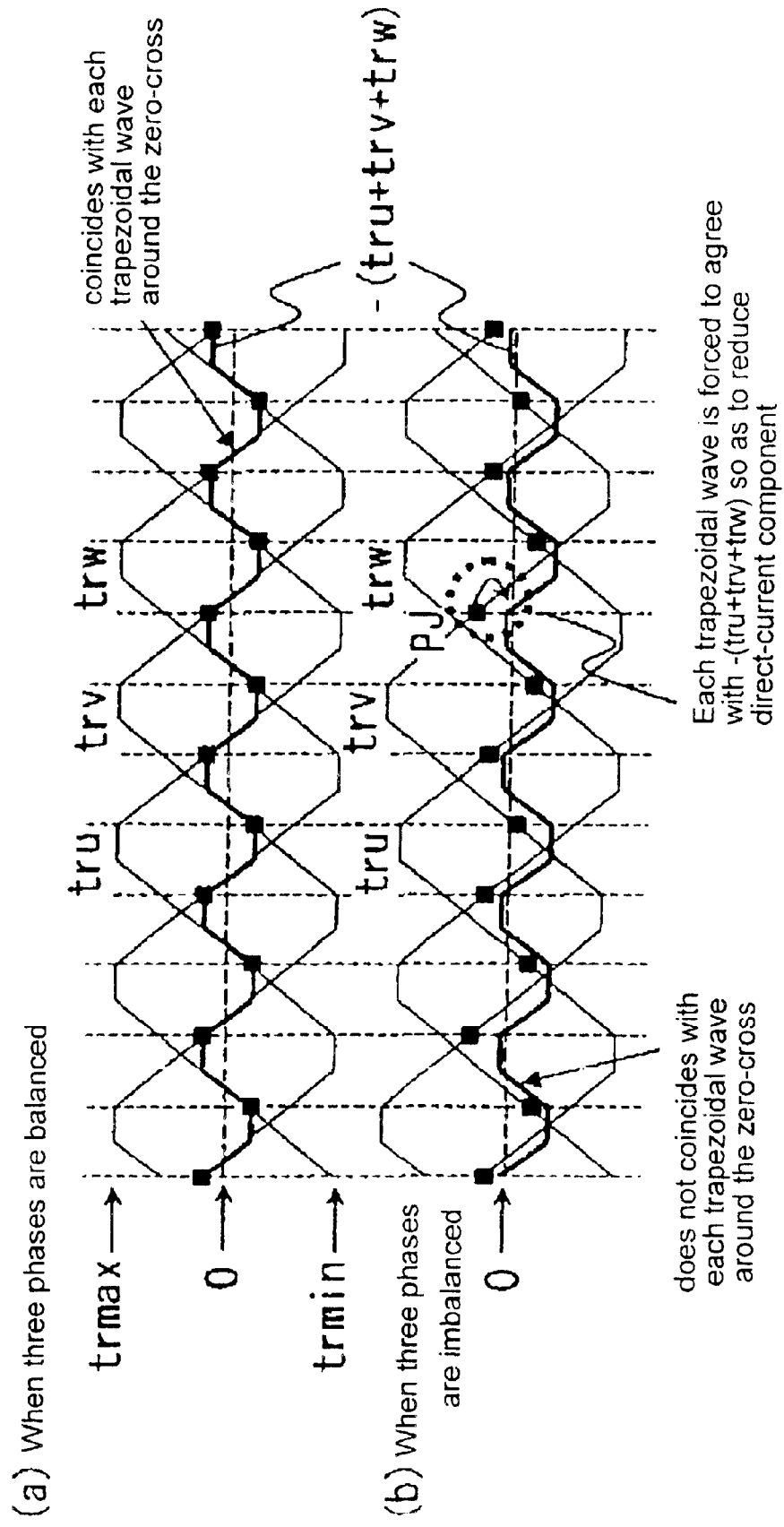
FIG. 5 illustrates waveforms of a direct-current component offset device according to the first Embodiment.

As observed in the upper part of FIG. 5, when three phases have a balanced and ideal trapezoidal wave having a flat part of 30°, the signal of −(tru+trv+trw) becomes a triple periodic trapezoidal wave relative to each trapezoidal wave, and coincides with each trapezoidal wave in the vicinity of zero-level. However, when the three phases have an imbalanced wave as shown in a lower part of FIG. 5, the signal of −(tru+trv+trw) does not coincide with it.

Hence, the signal of −(tru+trv+trw) is fed back from the trapezoidal wave direct-current offset device 26 to the trapezoidal wave generator 21 so that the trapezoidal wave for each phase is forced to agree with the signal of −(tru+trv+trw) in synchronization with the position detecting signal, for example, at a point PJ as shown in the lower part of FIG. 5. This operation is repeated in every period at times of synchronizing with the position detecting signals, shown as small squares in FIG. 5, and thereby the direct-current component occurring on trapezoidal waves for each phase can be reduced.

<Quasi-sinusoidal Wave Modulator 13 (FIG. 6)>

Figure 6:
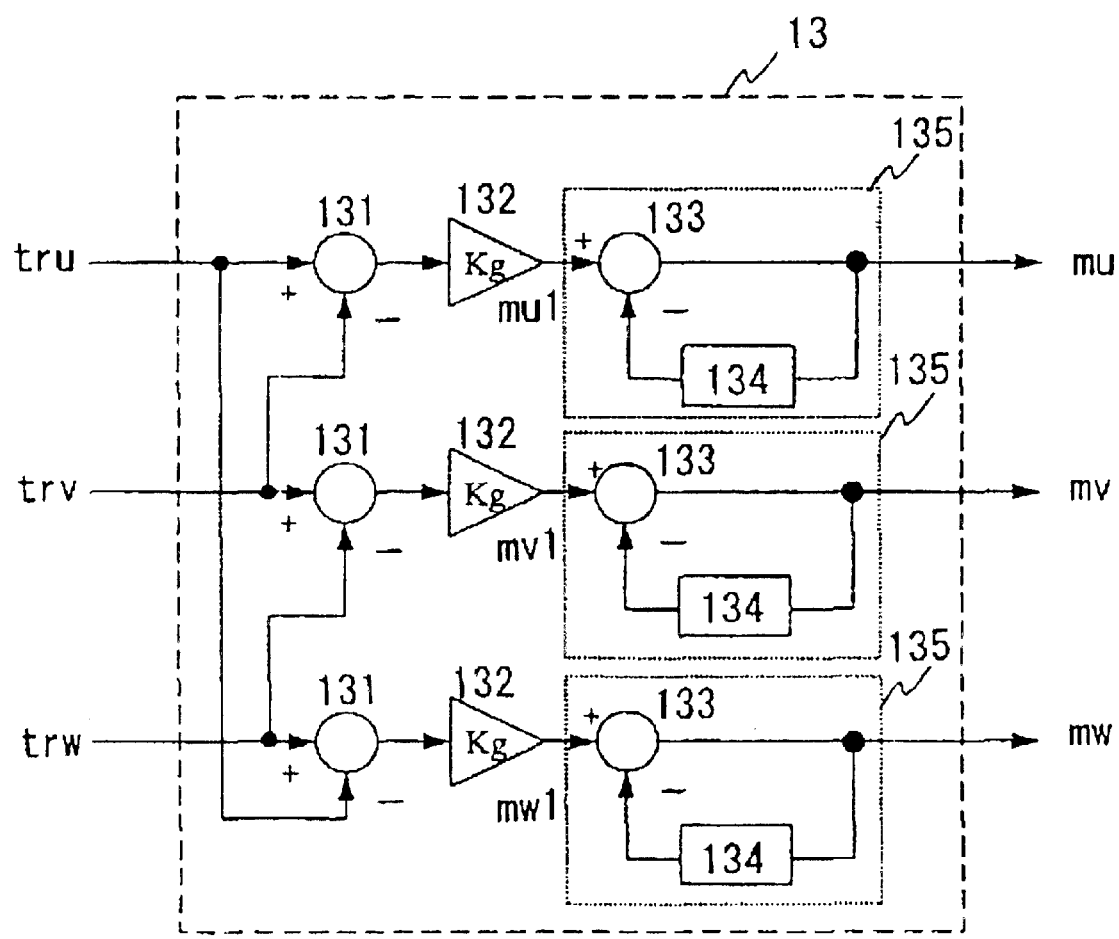
FIG. 6 is a block diagram of a quasi-sinusoidal wave modulator according to the first Embodiment.

FIG. 6 illustrates a configuration of a quasi-sinusoidal wave modulator 13. The quasi-sinusoidal wave modulator 13 comprises, for each phase, a first subtractor 131, an amplifier 132 having an amplified gain Kg, and a quasi-sinusoidal wave direct-current component offset device 135, which includes a second subtractor 133 and an arithmetic device 134.

In other words, first quasi-sinusoidal wave signals mu1, mv1, and mw1 are generated from the trapezoidal wave signals tru, trv, and trw each having a flat part of 30° using the subtractor 131 and amplifier 132 by the following relational expressions:

$$mu1 = Kg \times (tru - trv)$$

$$mv1 = Kg \times (trv - trw)$$

$$mw1 = Kg \times (trw - tru)$$

The generated first quasi-sinusoidal wave signals are inputted into the quasi-sinusoidal wave direct-current component offset device 135, and as outputs thereof, quasi-sinusoidal wave signals mu, mv, and mw are generated and outputted to the pulse width modulator 6. Herein, Kg is a gain to determine the amplitude of a quasi-sinusoidal wave signal.

Figure 7:
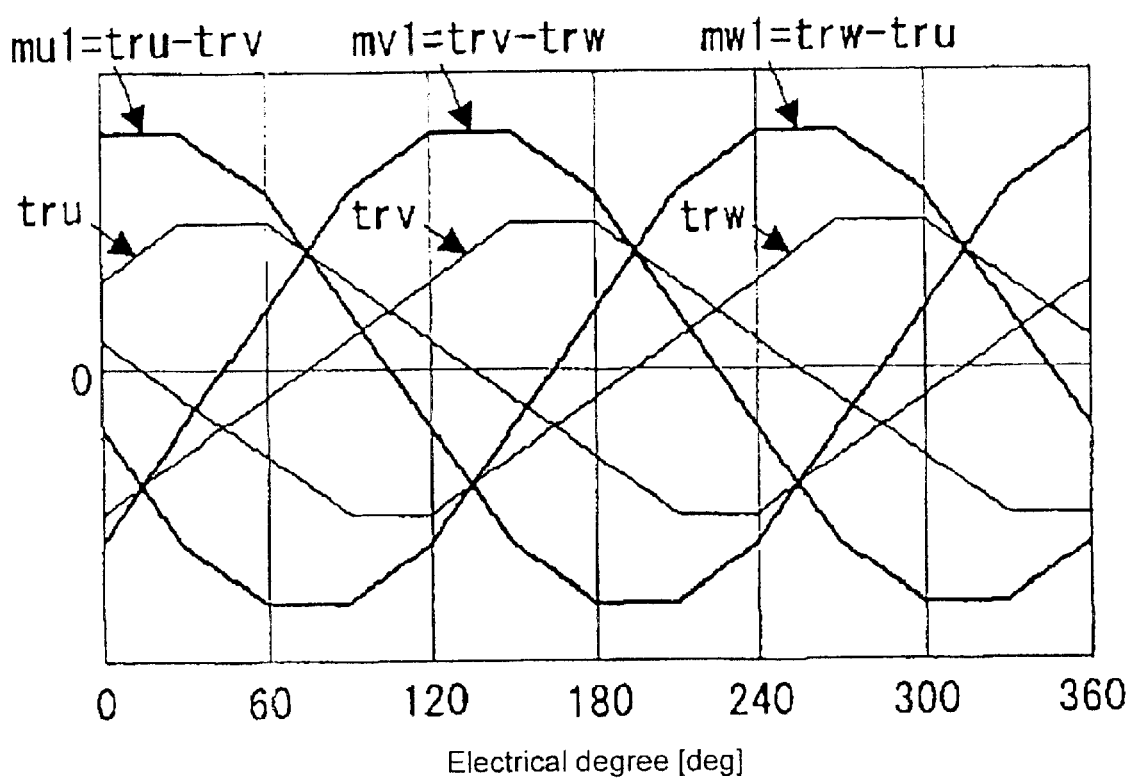
FIG. 7 illustrates waveforms of major parts of the quasi-sinusoidal wave modulator according to the first Embodiment.

FIG. 7 illustrates operational waveforms of the quasi sinusoidal wave modulator 13.

The expression "tru, trv, and trw" are, for three phases, respectively, trapezoidal waves each having a flat part of 30°. In the above expressions, when Kg=1, mu1, mv1, and mw1 each have a quasi-sinusoidal wave as shown in FIG. 7.

<Length of a Flat Part of Trapezoidal Wave (FIG. 8)>

Figure 8:
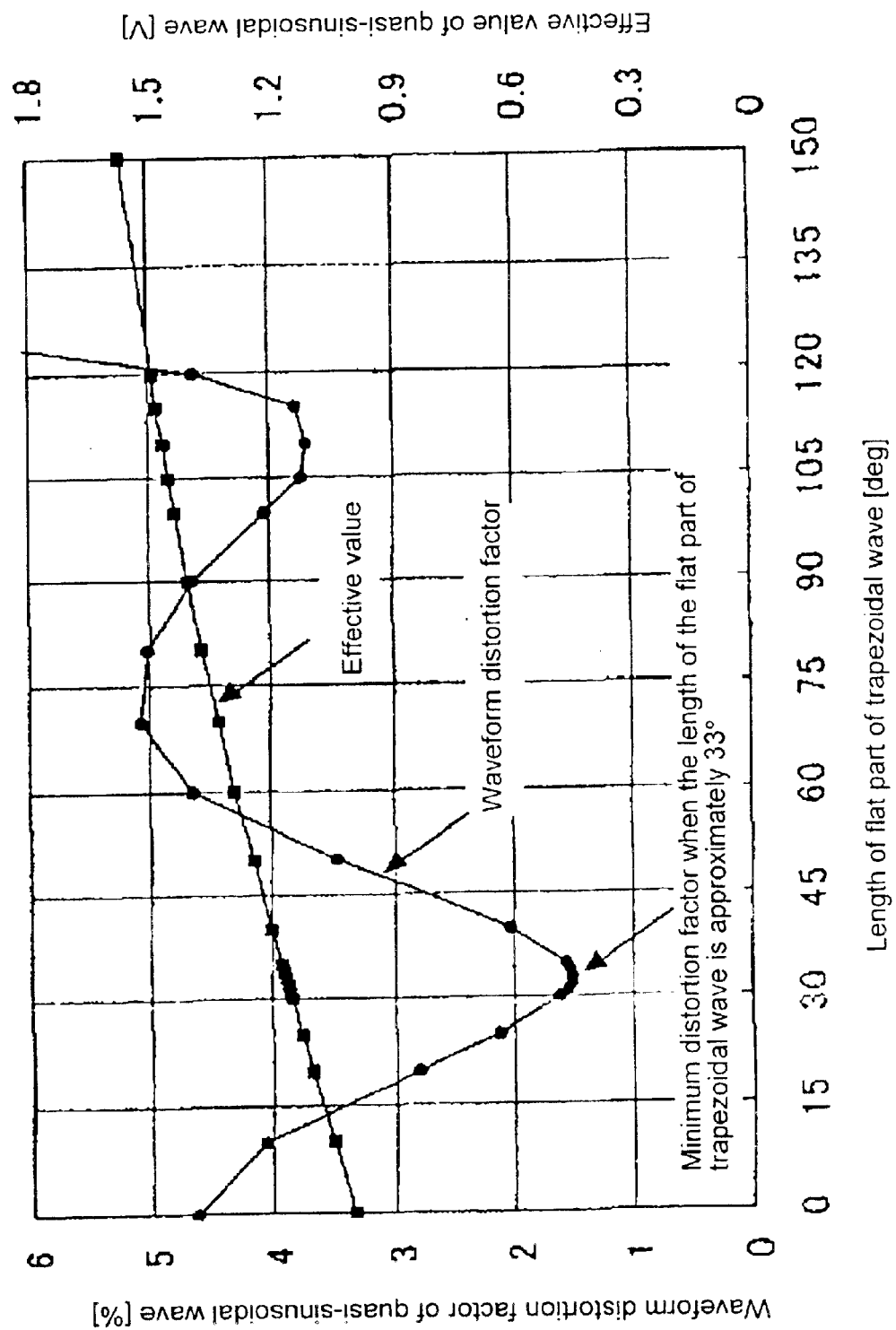
FIG. 8 is an explanatory view illustrating the differences depending on the length of flat parts of the trapezoidal wave.

Here, the reason why the quasi-sinusoidal wave is generated using a trapezoidal wave signal having a flat part of 30° is explained using FIG. 8.

FIG. 8 illustrates the relation between waveform distortion factors and effective values of quasi-sinusoidal waves generated by using a flat part angle of a trapezoidal wave as a parameter and taking the difference between two trapezoidal waves having 120-degree lag with each other. In the figure, plotted round dots and square dots indicate the waveform distortion factors and effective values of waveforms, respectively.

According to the figure, it is found that the waveform distortion factor of the quasi-sinusoidal wave is minimum when the trapezoidal wave has a flat part of approximately 33°. When it is assumed that the inductive voltage of the motor has a sinusoidal wave, the torque ripples can be reduced by making the waveform distortion factor of the applied voltage as low as possible. Therefore, in order to minimize the torque ripples, it is considered that a trapezoidal wave having a flat part of approximately 33° should be used as an original waveform because it has the smallest waveform distortion factor of a quasi-sinusoidal wave.

However, in terms of the simplicity for waveform generation, the flat part of 30° is desired, which is close to the angle at which the torque ripples are minimized. Thus, in the present embodiment, a trapezoidal wave having a flat part of 30° is employed.

However, the length of the flat part of trapezoidal wave is not limited to 30°.

For example, the length of the flat part of trapezoidal wave of 60°±5° may be used. This is because it is generally easy to generate an on/off signal at every 60° of electrical angle from a Hall IC signal of the position detector, and switching of charging/discharging the capacitor can easily be performed at the timing of this signal. However, in such case, an installation error of the Hall IC or the like may also cause the length of the flat part of trapezoidal wave to deviate by approximately ±5° from the 60-degree.

Further, the length of the flat part of trapezoidal wave may be 0°, that is a triangular wave. This is also because this waveform can easily be generated to synchronize with the on/off timing of the Hall IC signal at every 60° of electrical angle as mentioned above.

Furthermore, the length of the flat part of a trapezoidal wave may be set between 15° and 50°. This is because, though the torque ripples in the case of the length of the flat part of approximately 115° in the FIG. 8 are small, the torque ripple factor in the case of the length set between 15° and 50° can be reduced further than the torque ripple factor in the case of the length of 115°.

In particular, the length may be 33°±5° as mentioned above. This is because the length of the flat part of a trapezoidal wave of 33° can reduce the torque ripples to the greatest extent. However, deviation of ±5° may occur due to errors in installing the Hall IC or the like.

<Quasi-sinusoidal Wave Direct-current Component Offset Device (FIG. 9)>

Next, the role of the quasi-sinusoidal wave direct-current component offset device 135 will be explained.

Without the quasi-sinusoidal wave direct-current component offset device 135, direct-current components of the quasi-sinusoidal wave signal after the subtraction at each phase would be generated, even though direct-current components of the trapezoidal wave would be reduced by the trapezoidal wave direct-current component offset device 26. This would cause direct-current components to generate in a motor current, thereby causing torque ripples.

Figure 9:
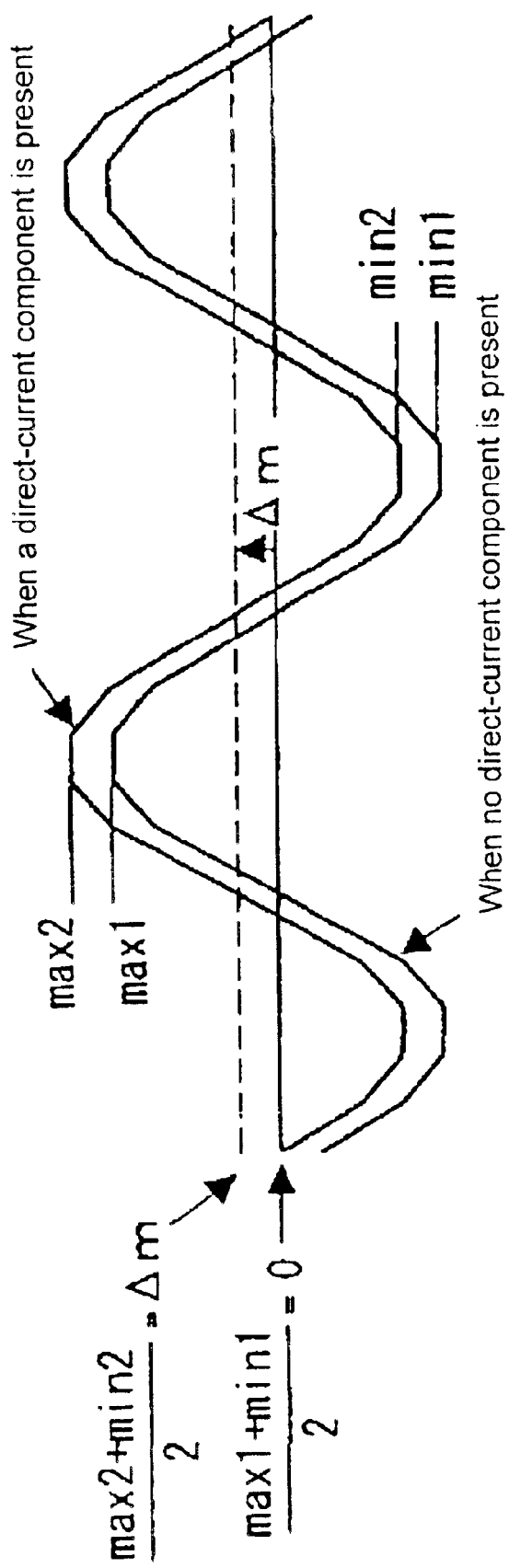
FIG. 9 is an explanatory view illustrating an offset operation of direct-current at a quasi-sinusoidal wave modulator.

FIG. 9 illustrates a state of this direct-current component. When the quasi-sinusoidal wave does not have a direct-current component as shown in FIG. 9, it has an amplitude in plus and minus ranges from a center of zero level. Therefore, when the sum of the maximum value max1 and the minimum value min1 is divided by two, the obtained mean value agrees with the zero level. However, when there exist direct-current components, the value obtained by dividing the sum of the maximum value max2 and the minimum value min2 by two does not agree with the zero level, and the deviation Δm is generated. Therefore, the subtraction of the deviation from the original waveform containing direct-current components enables the reduction of direct-current components of the quasi-sinusoidal wave. This can reduce imbalance of the current attributable to the direct-current components of the quasi-sinusoidal wave and the torque ripples. A circuit that accomplishes the above is the quasi-sinusoidal wave direct current component offset device 135. The arithmetic device performs the operation of Δm=(max1+max2)/2 to obtain the deviation Δm, which is subtracted from the first quasi-sinusoidal wave signals mu1, mv1, and mv2 thereby to generate quasi-sinusoidal wave signals mu, mv, and mw. The generated signals are outputted to the pulse width modulator 6.

Figure 10:
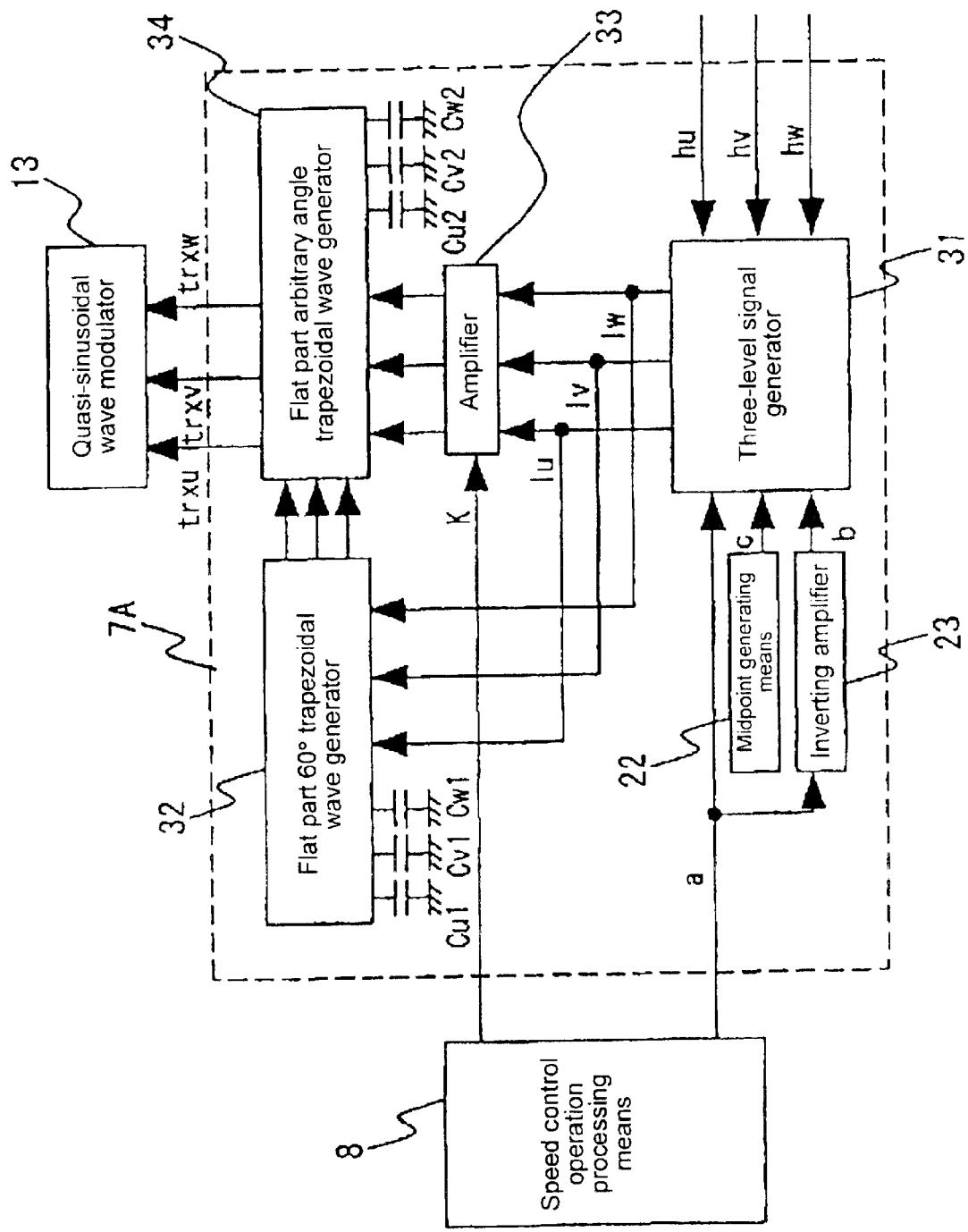
FIG. 10 is a block diagram of a trapezoidal wave modulator according to a second Embodiment.
Figure 11:
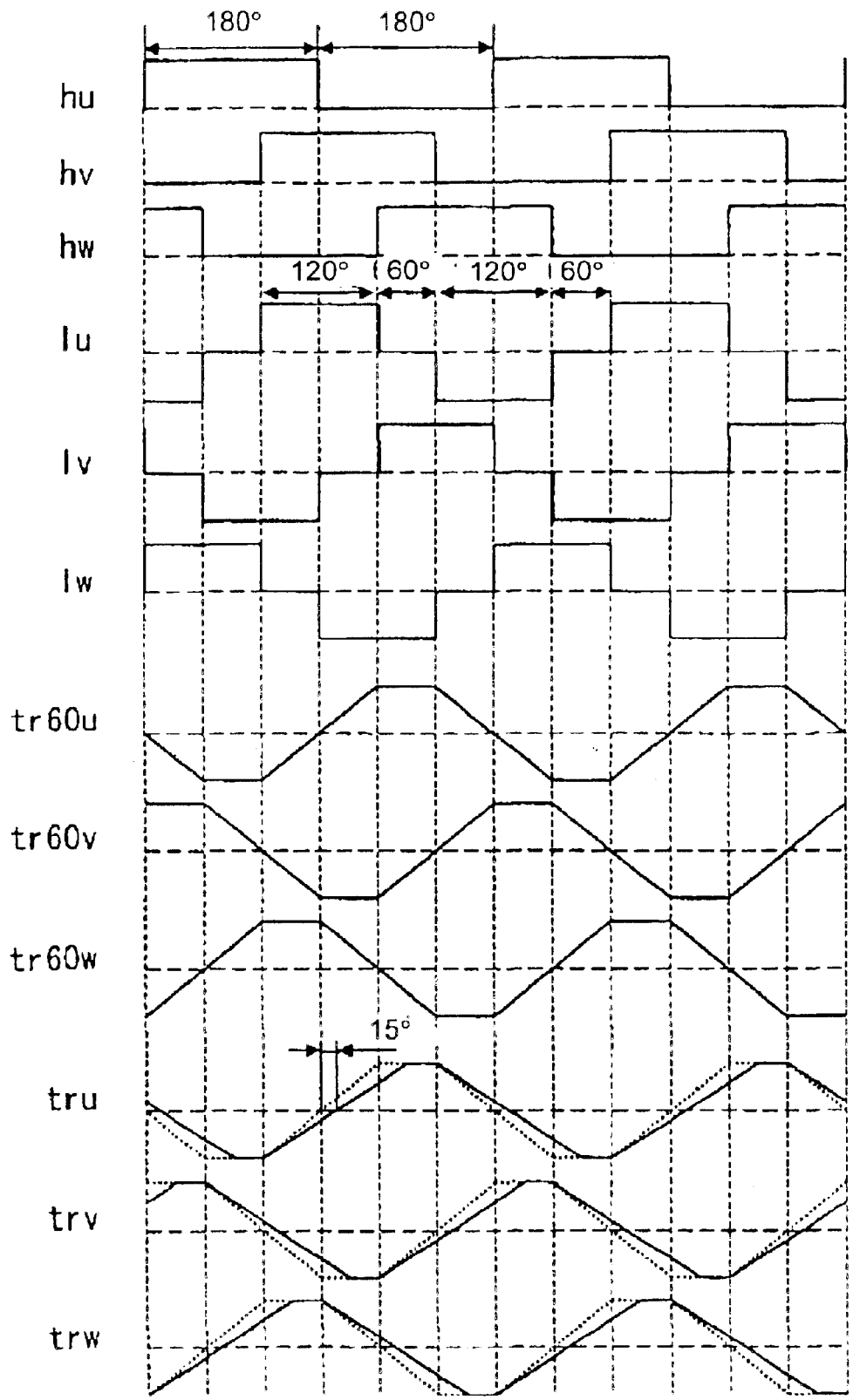
FIG. 11 illustrates waveforms of major parts of the trapezoidal wave modulator according to the second Embodiment.

Embodiment 2 (FIGS. 10 and 11)

Next, a second Embodiment of the present invention will be described using FIGS. 10 and 11. The second embodiment has the same configuration as shown in FIG. 1 except that the trapezoidal wave modulator 7 of the previous embodiment is replaced with a trapezoidal wave modulator 7A. Major differences are that a trapezoidal wave having a flat part of an arbitrary angle other than 30° is used as a first modulated signal and that this arbitrary angle is adjustable.

FIG. 10 illustrates a configuration of the trapezoidal wave modulator 7A of the present embodiment together with its peripheral circuit. Further, FIG. 11 illustrates waveforms of each part of the trapezoidal wave modulator 7A. The difference from the trapezoidal wave modulator 7 of the previous embodiment is that the modulator 7A comprises a three-level signal generator 31, a trapezoidal wave generator 32 for generating a trapezoidal wave having a flat part of 60°, an amplifier 33, a trapezoidal wave generator 34 for generating a trapezoidal wave having a flat part of an arbitrary angle, and six capacitors Cu1, Cv1, Cw1, Cu2, Cv2, and Cw2.

To the three-level signal generator 31, voltage control signals a and b, a mid-point signal c, and position-detecting signals hu, hv, and hw are inputted, and three level signals lu, lv, and lw are generated and outputted by selecting any of the voltage control signals a and b, or the mid-point signal c in accordance with the position detecting signal.

Three-level signals are signals having periods, during which they become constant at three levels: maximum, medium, and minimum, as shown in FIG. 11. Their timing of changing from one level to the other level is synchronized with an edge of a pulse of each position detecting signal hu, hv, or hw.

These three-level signals lu, lv, and lw are inputted to the trapezoidal wave generator 32 for generating a trapezoidal wave having a flat part of 60° so that trapezoidal wave signals tr60u, tr60v, and tr60w, each having a flat part of 60°, are generated. As illustrated in FIG. 11, the trapezoidal wave generator 32 generates these signals as follows. For example, while the three-level signal lu has a maximum value of 120°, the capacitor Cu1 is charged with a current proportional to the amplitude of lu using a constant-current source inside the trapezoidal wave generator 32 so that a positive tilt of the trapezoidal wave signal tr60u having a flat part of 60° is formed. While the three-level signal lu has a medium value of 60°, the capacitor Cu1 keeps a peak voltage. While the three-level signal lu has a minimum value of 120°, a negative tilt of the trapezoidal wave signal tr60u having a flat part of 60° is formed. The tilts of the trapezoidal wave signals tr60v and tr60w each having a flat part of 60° are formed in accordance with each three-level signal lv, lw in the same matter as above.

Further, in addition to the above process, three-level signals lu, lv, and lw are inputted into an amplifier 33, and the K time-folded signals are inputted into trapezoidal wave generator 34. In the trapezoidal wave generator 34, capacitors Cu2, Cv2, and Cw2 are charged and discharged with a current proportional to the input signals to generate a ramp-shaped wave having a slightly gentler tilt than that of the trapezoidal wave signals tr60u, tr60v, and tr60w, each having a flat part of 60°. This ramp-shaped wave is limited by the flat part of the trapezoidal wave signal having a flat part of 60° so that arbitrary trapezoidal wave signals tru, trv, and trw are outputted. For example, when K=4/5, an upper base flat part becomes 30°. When K=6/7, it becomes 40°. In this way, the length of the flat part of the trapezoidal wave can be set depending on the values of K. These arbitrary trapezoidal wave signals tru, trv, and trw are inputted into a quasi-sinusoidal wave modulator 13.

Figure 12:
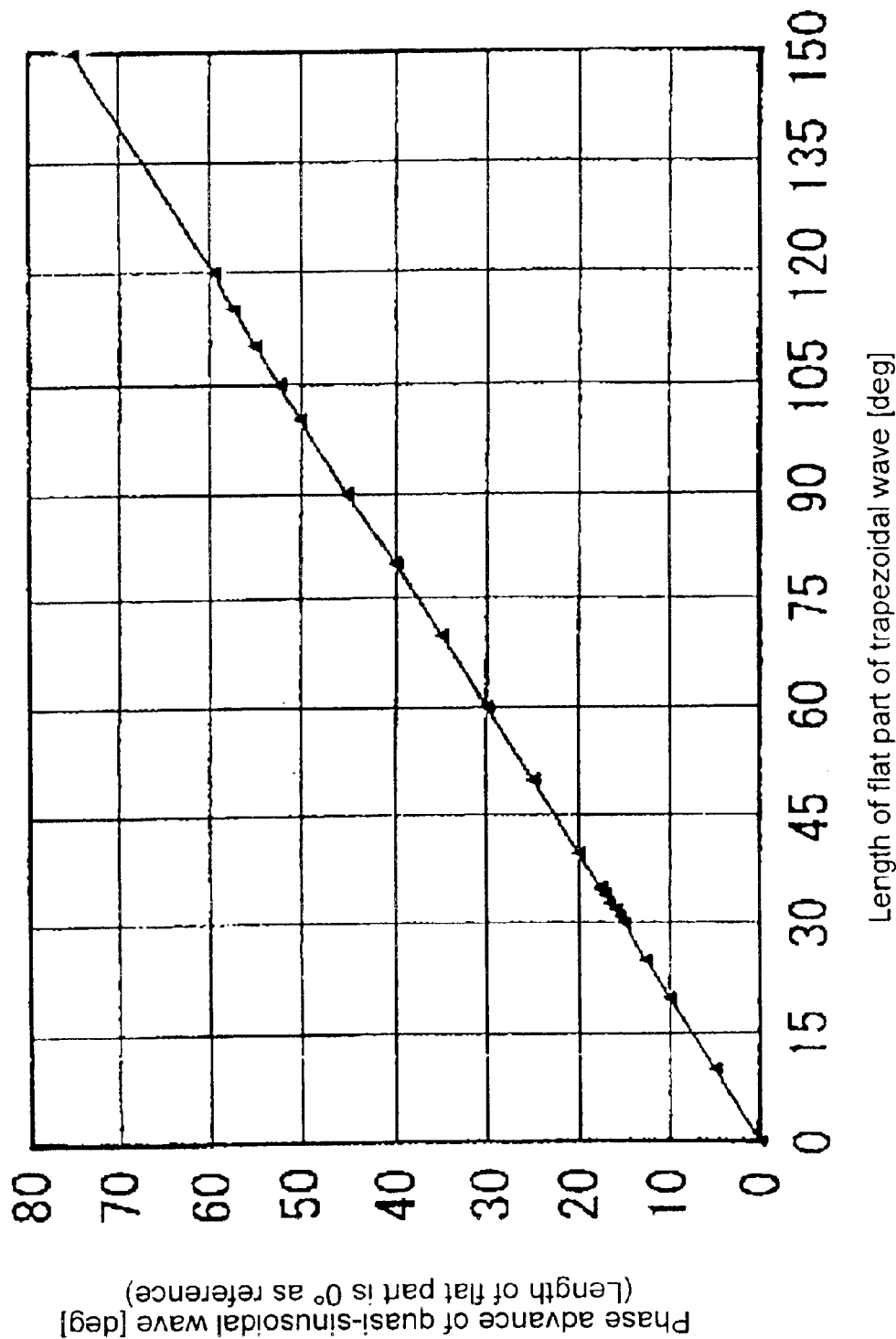
FIG. 12 illustrates a phase advance of a quasi-sinusoidal wave relative to the length of a flat part of a trapezoidal wave.

Here, when the length of the flat part of the trapezoidal wave is changed, the effects obtained thereby will be described. For example, in the case of the waveform of tru as shown in FIG. 11, phase difference of electrical angle of 15° is generated between a trapezoidal wave having a flat part of 30° represented by a solid line and a trapezoidal wave having a flat part of 60° represented by a broken line. In this way, the phase of a trapezoidal modulated wave can be manipulated depending on the length of the flat part of a trapezoidal wave, and in association with this the phase of a quasi-sinusoidal wave obtained by taking the difference between trapezoidal waves of each phase can also be manipulated. FIG. 12 shows a phase advance of a quasi-sinusoidal wave obtained by taking the difference between phases using the length of flat part of the trapezoidal wave as a parameter. When the flat part length of a trapezoidal wave is 0°, namely when the wave is triangular, the phase of the quasi-sinusoidal wave obtained by taking differences between phases is used as a reference. As understood from the figure, the phase of the quasi-sinusoidal wave is changeable in proportional to the length of flat part of the trapezoidal wave.

In this embodiment, the gain K is given by the speed control operation processing means. Referring to FIGS. 8 and 12, this effect is described. In an operation area where it is desired to reduce torque ripples for lowering the motor sound like creating a steady state, the value of K is set so that the flat part of the trapezoidal wave becomes close to 30°. When a high voltage is required, for example, in accelerating, or when load torque increases, the K value is set so that the flat part becomes 30° or more according to the necessity.

Figure 13:
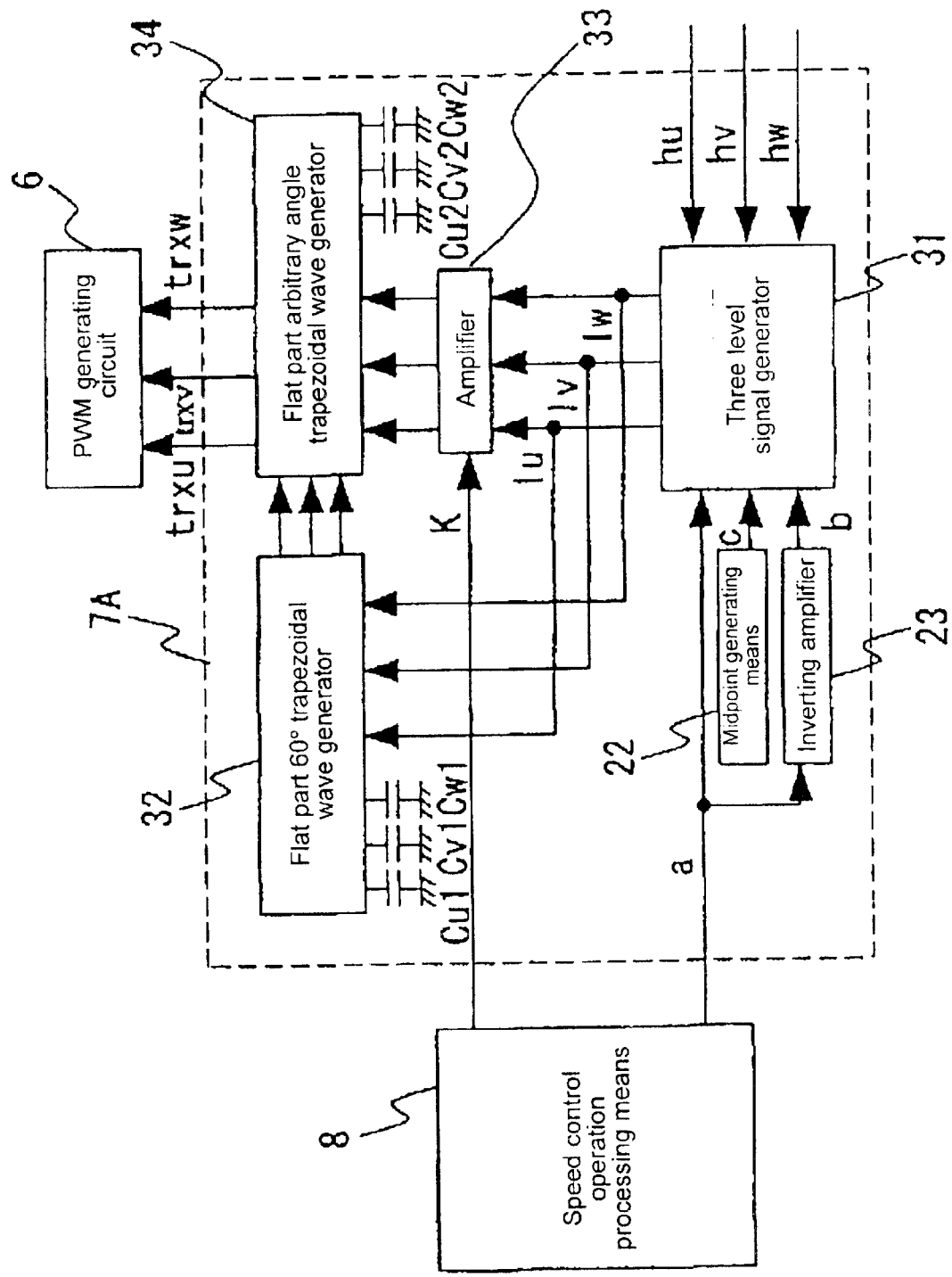
FIG. 13 is a block diagram of a trapezoidal wave modulator according to a third Embodiment.

Description of Third Embodiment (FIG. 13)

A third embodiment of the present invention will be described using FIG. 13.

FIG. 13 shows the configuration of a trapezoidal wave modulator 7A together with its peripheral circuits according to this embodiment. A major difference from the embodiments described above is that the second modulation circuit is removed to reduce the size of the modulation circuit. Due to this, in this embodiment, the trapezoidal wave modulator 7A shown in the above second embodiment is used as it is, and arbitrary trapezoidal wave signals tru, trv, and trw outputted therefrom are directly inputted into a pulse width modulator 6 and are compared with a carrier wave, thereby generating PWM signals.

In general, a line voltage is applied to the winding of a motor, and thus even when the waveform energized to each phase is trapezoidal, a voltage having a quasi-sinusoidal wave generated by subtraction of trapezoidal waves between two phases is practically applied. When tru, trv, and trw are regarded as three phases of trapezoidal waves, their line voltages are represented by tru−trv, trv−trw, and trw−tru, and thus quasi-sinusoidal waves mu1, mv1, and mw1, as shown in FIG. 7, are applied to the motor. Thus, even when the modulated wave of each phase is trapezoidal, almost the same torque ripple reduction effect can be obtained as when a quasi-sinusoidal wave is energized to each phase.

This enables a waveform distortion factor substantially around 30° to be the minimum in the same way as the distortion factor of the quasi-sinusoidal wave shown in FIG. 8. Therefore, it is possible to reduce torque ripples of the motor.

Herein, the trapezoidal wave modulator 7A may be replaced with the trapezoidal wave modulator 7.

Figure 14:
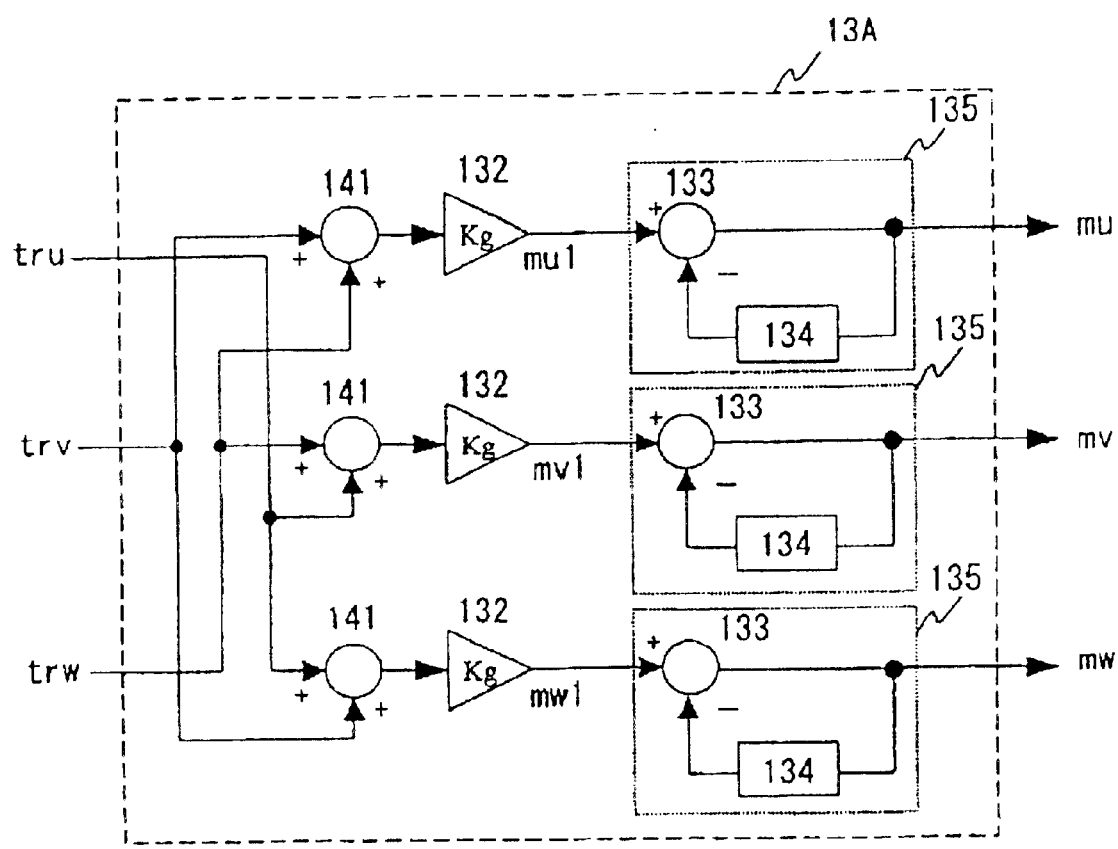
FIG. 14 is a block diagram of a quasi-sinusoidal wave modulator according to a fourth Embodiment.
Figure 15:
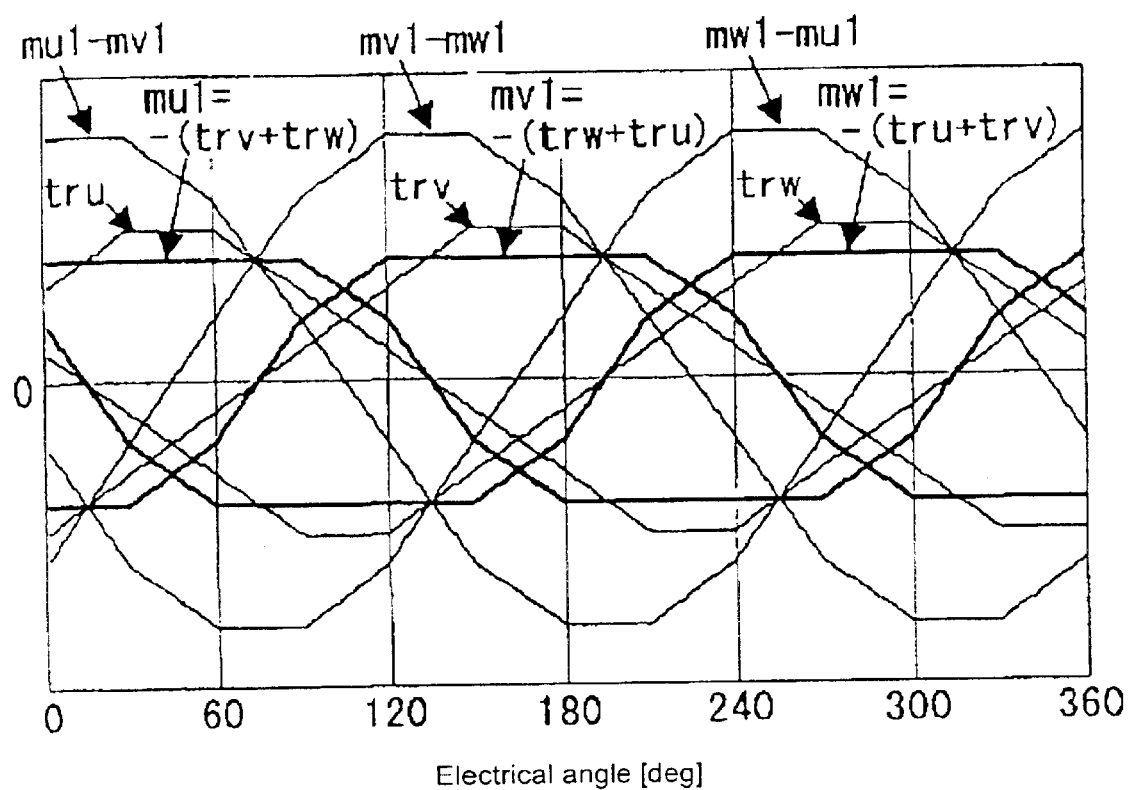
FIG. 15 illustrates modulated waveforms according to the fourth Embodiment.

Description of Fourth Embodiment (FIGS. 14 and 15)

Next, a fourth embodiment of the present invention will be described using FIGS. 14 and 15. The fourth embodiment has the same configuration as the first embodiment shown in FIG. 1 except that the quasi-sinusoidal wave modulator 13 of the first embodiment is replaced with a quasi-sinusoidal wave modulator 13A. A major difference therebetween is that a quasi-sinusoidal wave is obtained using the sum of trapezoidal wave signals each having a flat part of 30° between phases.

FIG. 14 shows the configuration of the quasi-sinusoidal modulator 13A according to this embodiment. Differences from the quasi-sinusoidal wave modulator 13 shown in the above embodiments are that addition devices 141 are used and the order of phases for addition is different from the order for subtraction shown in FIG. 6.

Namely, first quasi-sinusoidal wave signals mu1, mv1, and mw1 are generated from trapezoidal wave signals tru, trv, and trw each having a flat part of 30° through the following relational expressions using the addition devices 141 and the amplifiers 132.

$$mu1 = Kg \times (trv + trw)$$

$$mv1 = Kg \times (trw + tru)$$

$$mw1 = Kg \times (tru + trv)$$

Then, the signals are inputted into a quasi-sinusoidal wave direct current component offset devices 135, and quasi-sinusoidal waves mu, mv, and mw are generated and outputted to the pulse width modulator 6. Here, Kg is a gain to determine the amplitude of the quasi-sinusoidal wave signals.

FIG. 15 shows operation waveforms of the quasi-sinusoidal wave modulator 13A.

The expressions tru, trv, and trw are trapezoidal waves for three phases each having a flat part of 30°. When Kg=−1 in the above expressions, mu1, mv1, and mw1 become quasi-sinusoidal waves as shown in FIG. 15, each of which has the same phase, a smaller amplitude and a longer flat part than each trapezoidal wave.

Further, when the values between these phases are taken, quasi-sinusoidal waves represented by mu1−mv1, mv1−mw1, and mw1−mu1 as shown in FIG. 15 are obtained, and they agree with the quasi-sinusoidal waves shown in FIG. 7. In this embodiment, in order to obtain the same quasi-sinusoidal waves, each of mu1, mv1, and mw1 having a smaller amplitude waveform than each of trapezoidal waves tru, trv, and trw is compared with a carrier wave signal for generating PWM signals. This enables high utilization of a direct voltage. In other words, it is advantageous that a smaller direct voltage is enough to obtain the same motor voltage.

Figure 16:
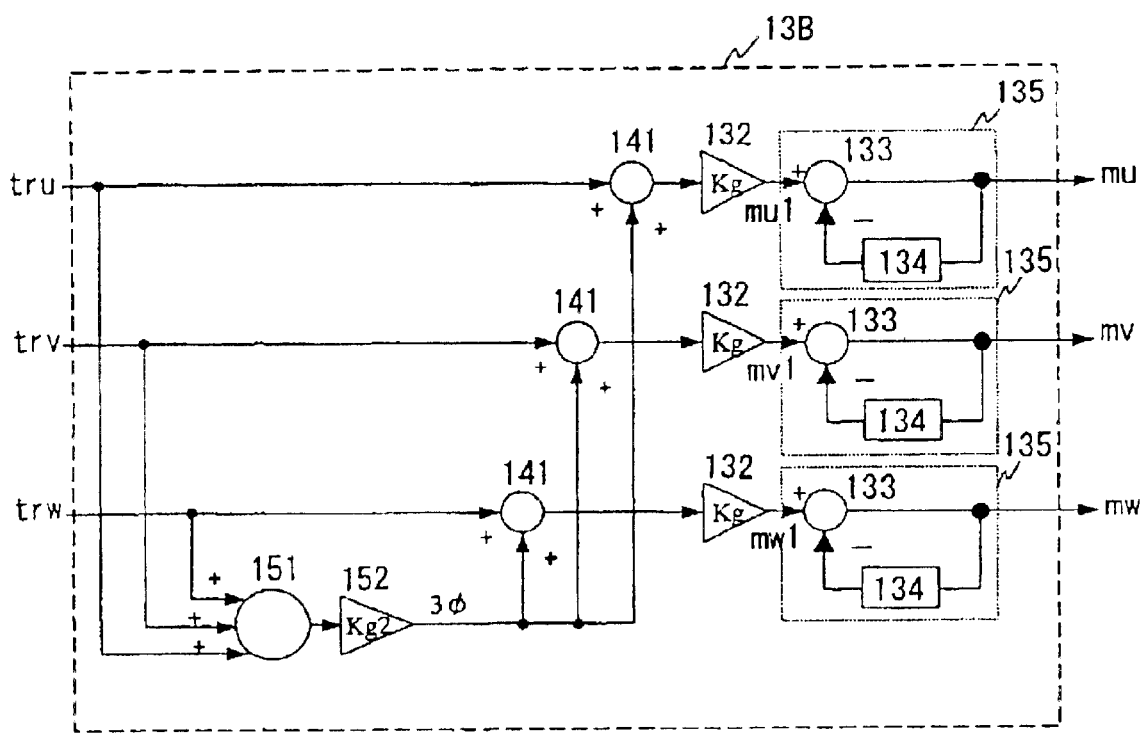
FIG. 16 is a block diagram of a quasi-sinusoidal wave modulator according to a fifth Embodiment.
Figure 17:
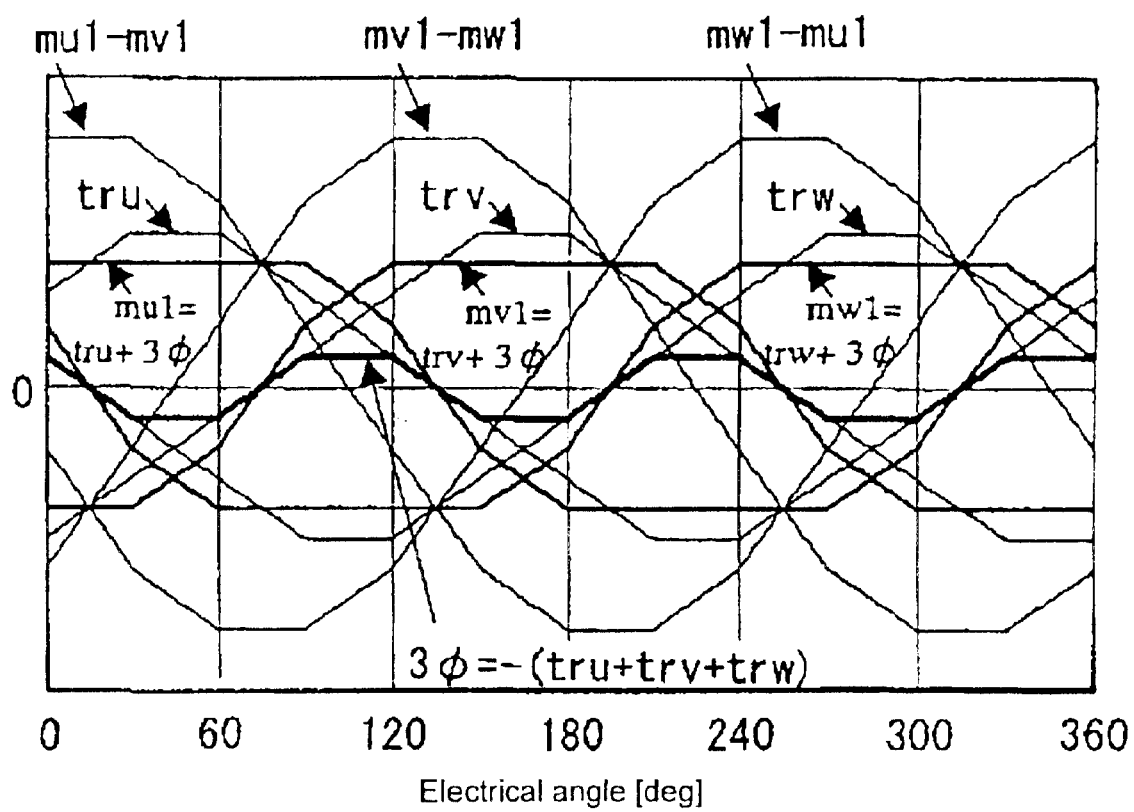
FIG. 17 is an explanatory view illustrating modulated waveforms according to the fifth Embodiment.

Description of Fifth Embodiment (FIGS. 16 and 17)

Next, a fifth embodiment of the present invention will be described using FIGS. 16 and 17. The fifth embodiment has the same configuration as shown in FIG. 1 except that the quasi-sinusoidal wave modulator 13A is replaced with a quasi-sinusoidal wave modulator 13B. Major differences are that the addition of the trapezoidal waves between phases is not conducted, trapezoidal wave signals each having a flat part of 30° for phases are totally summed, and the total sum signal is used for obtaining quasi-sinusoidal wave signals.

FIG. 16 shows the configuration of a quasi-sinusoidal wave modulator 13B according to this embodiment. Differences from the quasi-sinusoidal wave modulator 13A shown in the above embodiments are that a total sum processing device 151 and a gain Kg2 (152) are used, and the trapezoidal wave for each phase and the product obtained by multiplying the total sum signal by the gain Kg2 are used as inputs to each of the addition devices 141.

Namely, a correction signal 3φ is generated from trapezoidal wave signals tru, trv, and trw each having a flat part of 30° using the total sum processing device 151 and the gain Kg2 (152) in the following manner.

3φ=Kg2×(tru+trv+trw) is added to each phase of a trapezoidal wave signal each having a flat part of 30°. Then, first quasi-sinusoidal wave signals mu1, mv1, and mw1 are generated through the following relational expressions.

$$mu1=Kg \times (tru+3\phi)$$

$$mv1=Kg \times (trv+3\phi)$$

$$mw1=Kg \times (trw+3\phi)$$

The signals are inputted into the quasi-sinusoidal wave direct current component offset device 135, and quasi-sinusoidal waves mu, mv, and mw are generated and outputted to the pulse width modulator 6. Here, Kg is a gain to determine the amplitude of the quasi-sinusoidal wave signals.

FIG. 17 shows an operation waveform of the quasi-sinusoidal wave modulator 13B. tru, trv, and trw are trapezoidal waves each having a flat part of 30° for three phases. When Kg2=−1 in the above expressions, 3φ=−(tru+trv+trw) becomes, as shown in the figure, a trapezoidal wave having a period 3 times as large as the trapezoidal wave having a flat part of 30°. This is added to tru, trv, and trw thereby to obtain mu1, mv1, and mw1, respectively. Then, they become quasi-sinusoidal waves as shown in FIG. 17, which have a smaller amplitude and a longer flat part than each phase of a trapezoidal wave. These have the same waveform as the quasi-sinusoidal waves obtained in the fourth embodiment.

Further, when the values between these phases are taken, quasi-sinusoidal waves represented by mu1−mv1, mv1−mw1, and mw1−mu1 as shown in FIG. 17 are obtained, and they agree with the quasi-sinusoidal waves shown in FIG. 7. In this embodiment, in order to obtain the same quasi-sinusoidal waves, each of mu1, mv1, and mw1 for each phase having a smaller amplitude waveform than each of trapezoidal waves tru, trv, and trw is compared with a carrier wave signal for generating PWM signals. Therefore, it is advantageous that high utilization of direct voltage is achieved in the same manner as the fourth embodiment.

Concerning the Form of Trapezoidal Wave (FIG. 18)

In the embodiments of this specification, a three phase trapezoidal wave having two constant levels in one period as shown in the upper figure of FIG. 18 is given as an example. Due to a smaller number of turning points, this waveform has smooth changes of voltage waveform, thereby reducing torque ripples attributable to break points.

In addition, the trapezoidal wave may be a three phase trapezoidal wave having more than two constant levels in one period, and examples thereof according to the present invention include a trapezoidal wave having four constant levels in one period as shown in the lower figure of FIG. 18.

Deployment of the Present Invention to Other Embodiments

As described above, the quasi-sinusoidal wave signals outputted from the quasi-sinusoidal wave modulator 13 in the first and second embodiments, the arbitrary trapezoidal wave signal in the third embodiment, and the quasi-sinusoidal wave signals outputted from the quasi-sinusoidal wave modulator 13A and quasi-sinusoidal wave modulator 13B in the fourth and fifth embodiments are inputted into the pulse width modulator 6. However, the signals may be inputted into the pulse width modulator 6 after they are smoothened by passing them through a filter circuit such as an RC filter. This can further reduce the waveform distortion factor.

Although a method for generating a trapezoidal wave using an analog circuit such as charging or discharging of a capacitor is described in the above embodiments, a digital circuit may be used.

Moreover, in the above embodiments, cases wherein an inverter 3 and a control circuit 10 are configured in a monolithic IC are described, but without limiting thereto, the inverter 3 and the control circuit 10 may be independently configured in two monolithic IC chips.

A driving apparatus for an alternating-current motor is an apparatus comprising: an inverter using direct current as input and alternating current as output; an alternating-current motor driven by alternating current; a magnetic pole position detector for generating a magnetic pole position signal of the alternating-current motor; a trapezoidal wave modulator for generating a plurality of trapezoidal wave signals based on the magnetic pole position signal; and a pulse width modulator for controlling the inverter through pulse width modulation by comparing the trapezoidal wave signal with a carrier wave signal.

Moreover, it is considered that the incorporation of the IC device into the motor produces the following effects.

The present invention has been accomplished taking the above points into account, and has an object of providing a driving apparatus for an alternating-current motor capable of reducing torque ripples with a relatively simple circuit. Thus, it is possible to minimize the size of the entire motor drive system (motor+inverter+controller).

The wiring between the motor and inverter is shortened, and thus the influence caused by external noises can be reduced.

According to the above-mentioned points, a modulated signal having an extremely small waveform distortion can be generated using a relatively simple circuit, and thereby it is possible to hold down the vibrations and noise of the motor, which are attributable to torque ripples.

Further, since the period of the flat part of a trapezoidal wave is made controllable, the torque ripples, the voltage values, and the phase are changeable according to operating states.

Furthermore, the circuit is simplified, so that the generation of a PWM signal, which has conventionally been conducted by a speed control operation processing means such as a microcomputer, can be conducted with a control circuit integrally formed with a monolithic IC having an inverter formed therein. This reduces the load of a processor such as a microcomputer in terms of controlling or monitoring various motor drive devices. Therefore, it is possible to use a small or inexpensive processor.

Effect of the Invention

The present invention can provide a driving apparatus for an alternating-current motor capable of reducing torque ripples with a relatively simple circuit.

What is claimed is:

1. A driving apparatus for an alternating-current motor comprising: an inverter using direct current as input and alternating current as output; an alternating-current motor driven by the alternating current; a magnetic pole position detector for generating a magnetic pole position sensing signal of the alternating-current motor; a trapezoidal wave modulator for generating a plurality of trapezoidal wave signals having at least two constant levels within one period, based on the magnetic pole position sensing signal; a quasi-sinusoidal wave modulator for generating a plurality of quasi-sinusoidal wave signals based on the plurality of trapezoidal wave signals; and a pulse width modulator for controlling the inverter through pulse width modulation by comparing the plurality of quasi-sinusoidal wave signals with a carrier wave signal.

2. The driving apparatus according to claim 1, wherein the quasi-sinusoidal wave modulator generates the plurality of quasi-sinusoidal wave signals from the differences among the plurality of trapezoidal wave signals.

3. The driving apparatus according to claim 1, wherein the quasi-sinusoidal wave modulator generates the plurality of quasi-sinusoidal wave signals from the sum of the plurality of trapezoidal wave signals.

4. The driving apparatus according to claim 1, wherein the quasi-sinusoidal wave modulator generates the plurality of quasi-sinusoidal wave signals by computing the total sum of the plurality of trapezoidal wave signals and adding the value obtained by subtracting the total sum from a zero level to the plurality of trapezoidal wave signals.

5. The driving apparatus according to claim 1, wherein, among at least two constant levels within one period, the widths of the maximum and minimum levels have an electrical angle substantially from 15° to 50°.

6. The driving apparatus according to claim 1, wherein, among at least two constant levels within one period, the widths of the maximum and minimum levels have an electrical angel of substantially 30°.

7. The driving apparatus according to claim 1, wherein the width of at least two constant levels within one period can arbitrarily be set.

8. The driving apparatus according to claim 1, wherein the trapezoidal wave modulator has a trapezoidal wave direct-current offset device, which generates a new trapezoidal wave signal by computing the total sum of the plurality of trapezoidal wave signals and synchronizing with the timing of the position sensing signal of magnetic pole so as to bring the value of trapezoidal wave signal close to the value obtained by subtracting the total sum from a zero level.

9. The driving apparatus according to claim 1, wherein the quasi-sinusoidal wave modulator generates a new quasi-sinusoidal wave signal by subtracting a half of the sum of the maximum and minimum values of the quasi-sinusoidal wave signal from the quasi-sinusoidal wave signal.

10. An inverter controller comprising: an inverter using direct current as input and alternating current as output; a trapezoidal wave modulator for generating a plurality of trapezoidal wave signals having at least two constant levels within one period based on a magnetic pole position sensing signal of an alternating-current motor; a quasi-sinusoidal wave modulator for generating a plurality of quasi-sinusoidal wave signals based on the plurality of trapezoidal wave signals; and a pulse width modulator for controlling the inverter through pulse width modulation by comparing the plurality of quasi-sinusoidal wave signals with a carrier wave signal.

11. A semiconductor apparatus for controlling an inverter, comprising a single chip, said single chip comprising an inverter using direct current as input and alternating current as output; a trapezoidal wave modulator for generating a plurality of trapezoidal wave signals having at least two constant levels within one period based on a magnetic pole position sensing signal of an alternating-current motor; a quasi-sinusoidal wave modulator for generating a plurality of quasi-sinusoidal wave signals based on the plurality of trapezoidal wave signals; and a pulse width modulator for controlling the inverter through pulse width modulation by comparing the plurality of quasi-sinusoidal wave signals with a carrier wave signal are mounted.

12. A semiconductor apparatus for controlling an inverter comprising two chips, wherein the inverter using direct current as input and alternating current as output is mounted on one chip, wherein a trapezoidal wave modulator for generating a plurality of trapezoidal wave signals having at least two constant levels within one period based on a magnetic pole position sensing signal of an alternating-current motor; a quasi-sinusoidal wave modulator for generating a plurality of quasi-sinusoidal wave signals based on the plurality of trapezoidal wave signals; and a pulse width modulator for controlling the inverter through pulse width modulation by comparing the plurality of quasi-sinusoidal wave signals with a carrier wave signal are mounted on the other chip.

13. A driving apparatus for an alternating-current motor comprising: an inverter using direct current as input and alternating current as output; an alternating-current motor driven by the alternating-current; a magnetic pole position detecting circuit for generating a magnetic pole position sensing signal of the alternating-current motor; a trapezoidal wave modulator for generating a plurality of trapezoidal wave signals having at least two constant levels within one period, wherein the widths of the maximum and minimum levels have an electrical angle of substantially 30° based on the position sensing signal; and a pulse width modulator for controlling the inverter through pulse width modulation by comparing the plurality of trapezoidal wave signals with a carrier wave signal.

* * * * *